United States Patent [19]

Kobayashi et al.

[11] Patent Number: 5,091,133
[45] Date of Patent: Feb. 25, 1992

[54] CONTINUOUS PRODUCTION PROCESS OF HIGH-STRENGTH AND HIGH-MODULUS POLYOLEFIN MATERIAL

[75] Inventors: Seizo Kobayashi; Takashi Mizoe; Yoshimu Iwanami, all of Yokohama, Japan

[73] Assignee: Nippon Oil Co., Ltd., Tokyo, Japan

[21] Appl. No.: 451,788

[22] Filed: Dec. 18, 1989

[30] Foreign Application Priority Data

Dec. 21, 1988 [JP] Japan ............... 63-320401
Jun. 14, 1989 [JP] Japan ............... 1-149492

[51] Int. Cl.⁵ .................................. B29C 43/26
[52] U.S. Cl. .......................... 264/119; 264/120; 264/126; 264/210.7; 264/280; 264/288.4; 425/371
[58] Field of Search ............... 264/119, 120, 123, 126, 264/210.1, 280, 288.4, 210.7; 425/371, 363

[56] References Cited

U.S. PATENT DOCUMENTS

| | | | |
|---|---|---|---|
| 4,545,950 | 10/1985 | Motooka et al. | 264/210.6 |
| 4,807,525 | 2/1989 | de Brock | 100/153 |
| 4,820,466 | 4/1989 | Zachariades | 264/119 |
| 4,879,076 | 11/1989 | Sano et al. | 264/28 |
| 4,881,888 | 11/1989 | Folkesson | 425/371 |

Primary Examiner—Mary Lynn Theisen
Attorney, Agent, or Firm—Oblon, Spivak, McClelland, Maier & Neustadt

[57] ABSTRACT

A high-strength and high-modulus polyolefin material can be continuously produced from a polyolefin in a powder form by feeding the polyolefin powder between a combination of endless belts disposed in an up-and-down opposing relation, compression-molding the polyolefin powder at a temperature lower than the melting point of the polyolefin powder by means of a pressing device while holding the polyolefin powder between the endless belts and conveying the same, and then rolling and stretching the resultant compression-molded polyolefin. The pressing device is constructed of pressing platens and corresponding sets of rollers, which are all accommodated within the respective endless belts. The rollers in each set are connected together, and the sets of rollers are arranged movably in an endless fashion between the respective platens and the endless belts associated therewith.

36 Claims, 1 Drawing Sheet

CONTINUOUS PRODUCTION PROCESS OF HIGH-STRENGTH AND HIGH-MODULUS POLYOLEFIN MATERIAL

BACKGROUND OF THE INVENTION a) Field of the Invention

The present invention relates to a process for continuously producing a high-strength and high-modulus polyolefin material by continuously compression-forming a polyolefin powder at a temperature lower than the melting point of the powder and then rolling and stretching the polyolefin thus compression-formed.

b) Description of the Related Art

So-called ultra-high-molecular-weight polyolefins having a significantly high molecular weight are used in a variety of fields as engineering plastics featuring inter alia excellent impact resistance and abrasion resistance and self-lubricating property. Since these ultra-high-molecular-weight polyolefins have a far higher molecular weight compared to general-purpose polyolefins, they are expected to provide molded or otherwise formed (hereinafter collectively called "molded") products having high strength and high modulus provided that they can be oriented to a high degree. A variety of investigations have therefore been conducted with a view toward achieving their high orientation.

Such ultra-high-molecular-weight polyolefins however have a higher melt viscosity compared to general-purpose polyolefins, so that under the circumstances, they show extremely poor formability whichever conventional forming method is applied, and their high orientation by stretching is not feasible.

Paul Smith and Peter J. Lemstra proposed a process for producing a high-strength and high-modulus polyolefin material by stretching a gel, which had been obtained from a decalin solution (dope) of an ultra-high-molecular-weight polyolefin, at a high draw ratio (Japanese Patent Laid-Open No. 15408/1981). The process is however practiced only at an extremely low polymer concentration in the dope, as low as 3 wt.% for polyolefins having a weight average molecular weight of 1,500,000 and 1 wt.% for those having a weight average molecular weight of 4,000,000. This process is however very disadvantageous from the economical viewpoint because its practice requires the use of a solvent in a large volume and tremendous difficulties are encountered upon preparation and handling of a high-viscosity solution.

Various proposals have also been made on processes for stretching and orienting single-crystal mats of ultra-high-molecular polyolefins to a high degree [U.S. Pat. No. 4,545,950, Japanese Patent Laid-Open Nos. 15120/1985 and 97836/1985, Preprint of The Society of Polymer Science, Japan, 34(4), 873 (1985)].

In these processes, solid-phase extrusion, stretching or the like is however conducted using a single-crystal mat which has been obtained in advance by converting an ultra-high-molecular-weight polyolefin into a dilute solution of a solvent such as xylene, decalin or kerosine and then subjecting the solution to cooling or isothermal crystallization. Therefore, the problem that a great deal of solvent is indispensable upon production of a single-crystal mat has not been solved yet by these processes either.

With a view toward solving the above-describe problems, the present inventors proposed a process for the production of a high-strength and high-modulus polyolefin material, which comprises compression-molding a polyolefin powder of an ultra high molecular weight at a temperature lower than the melting point of the powder without dissolution or melting and then rolling and stretching the polyolefin thus compression-molded (EP 253513).

However, the compression-molding step in the process disclosed therein is of the batch system that a polyolefin powder is held between heated, upper and lower pressing platens and then heated and pressed there for a predetermined time to obtain a pre-molded sheet. The above process thus involves problems such that it is inferior in productivity and a pressure of about several hundred kilograms per square centimeters or higher is generally required as a pressing pressure in order to obtain a material of sufficiently high strength and modulus.

SUMMARY OF THE INVENTION

An object of the invention is to provide a process for the continuous production of a high-strength and high-modulus polyolefin material.

Another object of the invention is to continuously obtain a high-strength and high-modulus polyolefin material by compression-molding a polyolefin powder at a temperature lower than the melting point of the polyolefin powder with a particular pressing means and then rolling and stretching the polyolefin thus compression-molded.

The above objects of the invention can be achieved by a process for the continuous production of a high-strength and high-modulus polyolefin material, which comprises:

feeding a polyolefin in a powder form between a combination of endless belts disposed in an up-and-down opposing relation;

compression-molding the polyolefin powder at a temperature lower than the melting point of the polyolefin powder by means of a pressing means while holding the polyolefin powder between the endless belts and conveying the same, said pressing means comprising pressing platens and corresponding sets of rollers, all accommodated within the respective endless belts, the rollers in each set being connected together, and said sets of rollers being arranged movably in an endless fashion between the respective platens and the endless belts associated therewith; and rolling the resultant compression-molded polyolefin, followed by stretching.

Owing to the use of the specific compression means, the process of the invention has the excellent advantages that compression molding can be carried out at a pressure lower than those employed in conventional processes in the polymerization and molding steps (compression molding, rolling, and stretching) without the need for any cumbersome procedure such as melting of a polyolefin or its dissolution in a solvent and a high-strength and high-modulus polyolefin material having superb physical properties can be produced continuously and easily.

DETAILED DESCRIPTION OF THE INVENTION

Examples of the polyolefin usable in the process of the invention for the continuous production of the high-strength and high-modulus polyolefin material include homopolymers of α-olefins having 2–8, preferably 2–6 carbon atoms, for example, low-density polyethylene, medium-density polyethylene, high-density polyethylene, polypropylene, polybutene-1 and poly-4-methylpentene-1; and copolymers of α-olefins whose carbon numbers are different, for example, copolymers of ethylene and α-olefins having 3–12, preferably 3–8 carbon atoms and copolymers of propylene and α-olefins having 4–12, preferably 4–8 carbon atoms.

Among these polyolefins usable in the process of the invention, those having a higher molecular weight are generally preferred because they can provide materials having higher strength and modulus. In the case of polyethylene for example, desired are those having a viscosity average molecular weight of 500,000–1,200,000, preferably 900,000–9,000,000, more preferably 1,200,000–6,000,000, or expressed in terms of intrinsic viscosity, those having an intrinsic viscosity of 5–50 dl/g, preferably 8–40 dl/g, most preferably 10–30 dl,/g, in other words, so-called ultra-high-molecular-weight polyethylenes. In the case of polypropylene, those having a molecular weight of at least 1,000,000 are also preferred.

No particular limitation is imposed on the shape of these polyolefins but granular or powdery polyolefins are preferably used in general. In the case of polyethylene for example, desired are those having a particle size not greater than 2,000 μm, generally 10–2,000 μm, preferably 10–1,000 μm. A narrower particle size distribution can afford a better sheet.

In the process of the invention for the continuous production of the high-strength and high-modulus polyolefin material, the polyolefin powder is first of all continuously compression-molded to obtain a compressed sheet.

Figure 1:
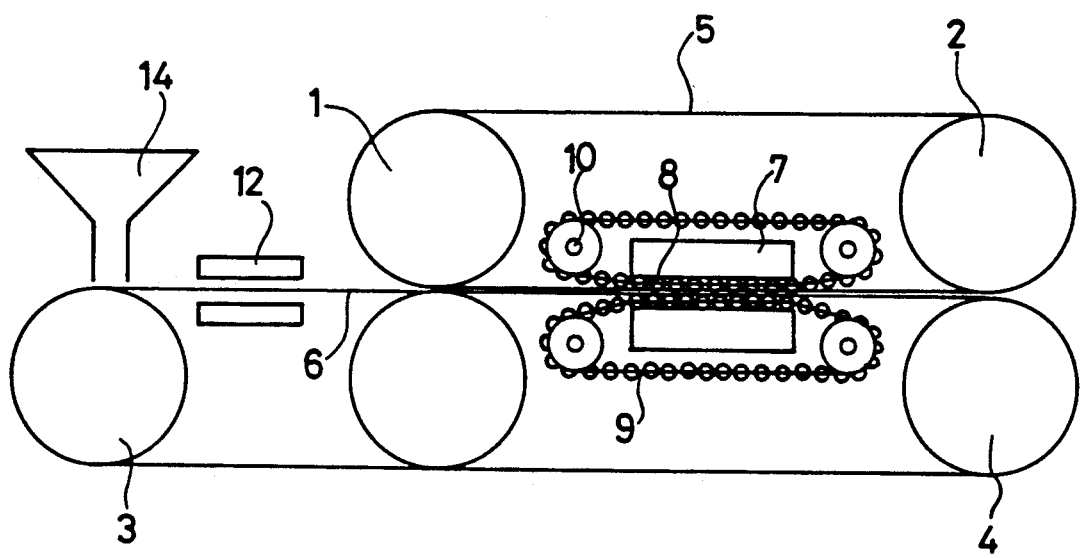
FIG. 1 is a simplified schematic illustration showing the outline of an apparatus useful in the practice of the production process according to the invention.

Regarding an apparatus useful for the formation of the compression-molded sheet, a brief description will next be made on the basis of FIG. 1 which illustrates a specific example of the apparatus.

The apparatus is basically constructed of a combination of endless belts 5,6 disposed taut in an up-and-down opposing relation by rolls 1–4, and a pressing means. The pressing means in turn has pressing platens 7,7 for pressing a polyolefin powder via the endless belts 5,6 and two sets of rollers 8 with chains 9. The rollers in each set are connected together. Further, the sets of rollers are arranged movably in an endless fashion between the respective platens and the endless belts associated therewith. Three or more rolls may be provided for each endless belt. No particular limitation is imposed on the outer diameter of the rolls as long as the endless belts can be driven smoothly.

As the endless belts, it is suitable to use those having a thickness of about 0.1 to 1.5 mm and a surface polished in a mirror-finished state on the side which is brought into contact with a polyolefin powder to be compression-molded. If the endless belts have an unduly small thickness, the endless belts are prone to deformations and damages. Excessively great thicknesses however lead to the need for large-diameter rolls for keeping the endless belts taut so that the apparatus becomes large as a whole. Such unduly small or large thickness is therefore not preferred. Stainless steel can be mentioned as a representative material for the endless belts. Other suitable metal belts can also be used either as they are or by coating them with a resin such as a fluorinated resin.

In the invention, the pressing means is constructed of the pressing platens 7,7 and the set of rollers 8, which are all accommodated within the corresponding endless belts 5,6. The rollers 8 in each set are connected together. Further, the sets of rollers 8 are arranged movably in an endless fashion between the corresponding platens 7,7 and the endless belts 5,6 associated therewith. As the rollers 8 in each set, it is suitable to arrange a number of rollers in such a way that the rollers are disposed with their axes of rotation extending substantially at right angles relative to the advancing direction of the associated endless belt and are close to each other but without mutual contact.

As the outer diameter of the rollers 8, a smaller diameter, specifically, about 5–30 mm are preferred. If the outer diameter of the rollers is unduly small, excessively large localized linear (i.e., nipping) pressures be applied to the endless belts so that the small-diameter rollers tend to leave wavy depressions in the endless belts and the endless belts are susceptible to deformations. If the rollers have an unduly large outer diameter on the other hand, it is necessary to make the pressing section (i.e., pressing platens) longer in the traveling direction of the polyolefin. If the pressing section is short, the pressing section cannot contain rollers as many as needed to provide good compression-molded sheets.

The rollers 8 in each set are connected rotatably to chains 9,9 at central axes thereof on both end faces thereof. The chains 9,9 are maintained in meshing engagement with sprockets 10 arranged on both upstream and down stream sides of the associated pressing platen 7, whereby the set of rollers 8 can be driven at a speed, suitably, about one half the travelling speed of the endless belts. Although two sprockets are used on each side of each set of rollers in the illustrated embodiment, three or more sprockets can be used as needed. The sets of rollers may be interposed fixedly between the corresponding endless belts and the pressing platens associated therewith, respectively. This fixed arrangement is however not preferred from the standpoint of the durability of the apparatus, because friction is produced due to the contact between the sets of rollers and their corresponding endless belts and also the contact between the sets of rollers and the associated pressing platens.

No particular limitation is imposed on the pressing plates as long as they have a smooth surface on the side where they are brought into contact with the associated sets of rollers and can transmit pressure evenly to the rollers in the associated sets.

The length of the pressing platens 7,7 may be generally about 30–400 cm, preferably about 50–200 cm in the travelling direction of the endless belts 5,6. The average pressure applied by the pressing platens 7,7 to the corresponding endless belts 5,6 can be generally about 0.1–20 kg/cm$^2$, preferably 0.5–10 kg/cm$^2$, more preferably 1.0–8.0 kg/cm$^2$.

Although it is the primary role of the pressing platens 7,7 to press the polyolefin powder via the associated endless belts 5,6, they can also be used as a heating means for the polyolefin powder.

In the process of the invention, practice of the compression-molding step at a temperature lower than the melting point of the polyolefin powder as a material to be compressed is extremely important for obtaining the high-strength and high-modulus polyolefin material through the subsequent rolling and stretching step. To obtain a suitable compression-molded sheet, it is desirable that the temperature is not only below the melting point but also falls within the following range. The temperature can be generally at least 50° C., preferably at least 90° C. for polyethylene polymers and generally at least 90° C., preferably at least 130° C. for polypropylene polymers, but lower than the respective melting points.

Figure 2:
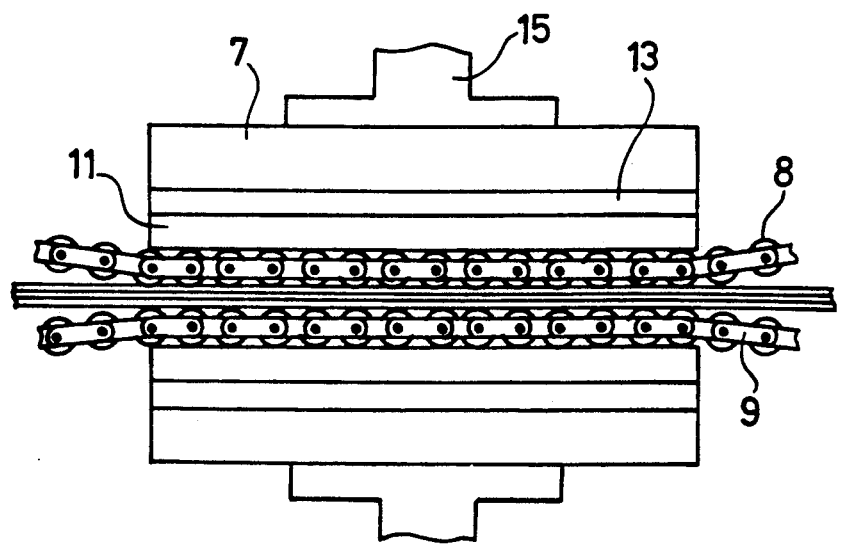
FIG. 2 is an enlarged view of a pressing section and its vicinity area in the apparatus of FIG. 1.

As a heating means for the compressed material (polyolefin powder), it is most suitable to directly heat the endless belts in the pressing section. As is depicted in FIG. 2, a heating means 11 can be arranged within each pressing platen 7 to heat the material, which is being compressed, from the pressing platen 7 by way of the associated set of rollers 8 and endless belt 5 or 6. As an alternative, a preheater 12 can be arranged in the proximity of at least one of the endless belts as shown in FIG. 1, whereby the material to be compressed is heated in advance. These heating means are convenient upon practice of the process of the invention.

Each pressing platen 7 can be provided with the heating means 11, for example, by applying a heat-insulating layer 13 on the pressing platen 7 and then embedding an electric heater in the pressing platen 7 or by arranging a flow passage in the pressing platen 7 and heating the pressing platen 7 with a heating medium.

To practice the process of the invention for the continuous production of a high-strength and high-modulus polyolefin material by means of the exemplified apparatus, a polyolefin powder which has been fed and stored in a hopper 14 is fed downwardly through an outlet, which has a desired cross-sectional shape, onto the running endless belt 6 located underneath the hopper 14. The running speed of the endless belt 6 is controlled depending on the length of the pressing platens 7,7 and compressing conditions. The running speed can generally be about 30–400 cm/min, preferably about 50–200 cm/min. The polyolefin powder carried on the endless belt 6 is optionally preheated to a predetermined temperature by means of the preheater 12 and is then brought to a squeezing section constructed of the upper and lower endless belts 5,6, followed by the further travelling to the pressing section where the sets of rollers 8 and the pressing platens 7,7 are arranged. In the pressing section, pressures from hydraulic cylinders (not shown) are transmitted from the hydraulic pistons 15,15 to the corresponding pressing platens 7,7. These pressures are transmitted further by way of the sets of rollers 8 and the endless belts 5,6 and are then applied to the polyolefin powder to be compressed. At the same time, heats from the heating means 11 are also transmitted to the polyolefin powder by way of the sets of rollers 8 and the endless belts 5,6, respectively, whereby the polyolefin powder is maintained at a predetermined temperature.

A compression-molded sheet thus obtained is fed past the downstream-side rolls 2,4 and are caused to leave away from the endless belts 5,6. In this manner, the compression-molded sheet is obtained continuously.

In the invention, a high-strength and high-modulus polyolefin material is obtained by rolling and then stretching the compression-molded sheet obtained as described above.

As a rolling method, any one of suitable conventional methods can be used. It is however suitable to obtain a rolled sheet or film by passing the compression-molded sheet between rolls, which are driven at different speeds, while maintaining the polyolefin in the state of solid phase without causing it to melt. At this time, the deformation ratio of the material by the rolling operation can be chosen from a wide range. Generally, it is preferable to set the deformation ratio at 1.2–20, preferably 1.5–20, more preferably 1.5–10 in terms of rolling efficiency (i.e., the length after the rolling/the length before the rolling). As the temperature at this time, it is desirable to conduct the rolling operation at a temperature of at least 20° C. but lower than the melting point, preferably at a temperature of at least 90° C. but lower than the melting point. Needless to say, the above rolling operation may be effected in multiple steps, namely, in two or more steps.

The stretching, which is conducted next to the rolling, can be performed in various ways. Depending on differences in heating means, there are hot-air stretching, cylinder stretching, roll stretching, hot-plate stretching, etc. Whichever method is employed, stretching is performed by driving a pair of nip rolls or crowbar rolls at different speeds. The stretching temperature can be 20°–150° C., preferably 50°–140° C. This stretching can be conducted not only in a single step but also in multiple steps. When it is conducted in multiple steps, it is preferable to conduct the stretching at a higher temperature in the second step than in the first step.

The stretching speed can be chosen suitably. It is generally in the range of 0.1–200 m/min. A higher speed is preferred from the standpoint of economy and the range of 5–200 m/min is generally preferred.

It is desirable to increase the draw ratio as much as possible, because higher strength and higher modulus can be attained as the draw ratio becomes greater. In the production process of the invention, a total draw ratio (a total draw ratio achieved by both rolling and stretching) of 60-fold in general, preferably of 80-fold to 200-fold is feasible, for example, when an ultra-high-molecular-weight polyethylene is used. Therefore, stretching at an extremely high draw ratio is feasible.

As a result, a high-strength and high-modulus polyolefin material is produced. According to the process of the invention, polyolefin materials of extremely high strength and high modulus can be obtained as typified by the provision of a polyethylene material having a modulus of elasticity in tension of at least 120 GPa and a tensile strength of at least 2 GPa when polyethylene is used as a polyolefin by way of example.

EXAMPLE 1

Specification of apparatus:
1. Rolls—diameter: 500 mm, surface length: 300 mm.
2. Steel belts—thickness: 0.6 mm, width: 200 mm.
3. Small-diameter rollers—diameter: 2 mm, length: 250 mm.
4. Pressing platens—length: 1,000 mm, width: 200 mm.
5. Hydraulic cylinders—diameter: 125 mm.

Using a compression-molding apparatus of the above specification, powder of an ultra-high-molecular-weight polyethylene having a viscosity average molecular weight of about 2,000,000 was heated to 130° C. and pressed at an average pressure of about 6 kg/cm$^2$, so that a sheet of 1.1 mm thick and 100 mm wide was continuously compression-molded at a speed of 1 m/min.

The sheet was then fed between a pair of rolls maintained at a surface temperature of 140° C., driven in opposite directions at a same upper and lower peripheral speed of 1 m/min, having a diameter of 150 mm and a surface length of 300 mm and disposed at an interval of 30 μm, whereby the sheet was rolled into a film having a draw ratio of 5-fold. The thus-obtained rolled film was slit at widths of 1 mm and then stretched at a draw ratio of 20-fold by means of a hot-roll type stretching apparatus having a roll diameter of 250 mm while controlling the temperature at 135° C. and the peripheral speed at 1.5 m/min for the lower speed roll and at 30 m/min for the higher speed roll. The resulting fibers had a tensile modulus of 130 GPa and a tensile strength of 3.4 GPa.

COMPARATIVE EXAMPLE 1

The procedure of Example 1 was repeated except for the use of a sheet having a thickness of 1.1 mm and molded under conditions of a temperature of 130° C. and a pressure of 5 kg/cm$^2$ and a pressing time of 10 minutes by using a pressing machine. However, stretching was achieved only to 9.5-fold. The resulting fibers had a tensile modulus of 85 GPa and a tensile strength of 2.6 GPa.

Measuring methods of modulus of elasticity in tension and strength

The modulus of elasticity and strength of each sample were measured at 23° C. by using "STROGRAPH R". The sample held between clamps had a length of 150 mm. It was stretched at a pulling speed of 100 mm/min. The modulus of elasticity was calculated using a stress at 0.1% strain. The cross-sectional area of the sample, which was required for the calculation, was determined by measuring the weight and length of the sample while assuming that the density of polyethylene was 1 g/cm$^3$.

We claim:

1. A process for the continuous production of a high-strength and high-modulus polyolefin material, which comprises:
   feeding a polyolefin in a powder form between a combination of endless belts disposed in an up-and-down opposing relation;
   compression-molding the polyolefin powder at a temperature lower than the melting point of the polyolefin powder by means of a pressing means while holding the polyolefin powder between the endless belts and conveying the same, said pressing means comprising pressing platens and corresponding sets of rollers, all accommodated within the respective endless belts, the rollers in each set being connected together, and said sets of rollers being arranged movably in an endless fashion between the respective platens and the endless belts associated therewith; and
   rolling the resultant compression-molded polyolefin, followed by stretching.

2. The process of claim 1, wherein the polyolefin is selected from the group consisting of homopolymers of α-olefins having 2-8 carbon atoms, copolymers of ethylene and α-olefins having 3-12 carbon atoms and copolymers of propylene and α-olefins having 4-12 carbon atoms.

3. The process of claim 2, wherein the polyolefin has a particle size distribution in a range of 10-2,000 μm.

4. The process of claim 1, wherein the endless belts have a belt thickness of 0.1-1.5 mm and a surface polished in a mirror-finished state.

5. The process of claim 4, wherein the rollers have an outer diameter of 5-30 mm.

6. The process of claim 1, wherein the endless belts have a running length of 30-400 cm and the press platens an average pressure of 0.1-20 kg/cm$^2$ to the endless belts.

7. The process of claim 2, wherein the compression-molding step is performed at 50° C. or higher where the polyolefin is a polyethylene polymer and at 90° C. or higher where the polyolefin is a polypropylene polymer.

8. The process of claim 2, wherein the temperature for the compression-molding step is maintained by a preheater provided in the proximity of at least one of the endless belts and a heating means applied to at least one of the press platen.

9. The process of claim 1, wherein the endless belts are driven at a running speed of 30-400 cm/min.

10. The process of claim 1, wherein the pressing means is fed with a pressure from at least one hydraulic cylinder.

11. The process of claim 1, wherein the compression-molded polyolefin is rolled at a deformation ratio of 1.2-20 in terms of rolling efficiency.

12. The process of claim 11, wherein the rolling step is performed at a rolling temperature in a range of at least 20° C. but lower than the melting point of the polyolefin powder.

13. The process of claim 1, wherein the thus-rolled polyolefin is stretched by pulling the same in accordance with a method selected from the group consisting of hot-air stretching, cylinder stretching, roll stretching and hot-platen stretching.

14. The process of claim 13, wherein the stretching is performed in a temperature range of 20°-150° C.

15. The process of claim 14, wherein the stretching is performed in multiple steps and the stretching in a latter step is conducted at a higher temperature than in the preceding step.

16. The process of claim 1, wherein the stretching is performed in a speed range of 0.1-200 m/min.

17. The process of claim 2, wherein the polyolefin is an ultra-high-molecular-weight polyethylene and the stretching is performed at a draw ratio of at least 60-fold.

18. A process for the continuous production of a high-strength and high-modulus polyolefin material, which comprises:
   feeding a polyolefin in a powder form between a combination of endless belts disposed in an up-and-down opposing relation;
   compression-molding the polyolefin powder at a temperature lower than the melting point of the polyolefin powder by means of a pressing means while holding the polyolefin powder between the endless belts and conveying the same, said pressing means comprising pressing platens and corresponding sets of rollers, all accommodated within the respective endless belts, the rollers in each set being connected together, and said sets of rollers being arranged movably in an endless fashion between the respective platens and the endless belts associated therewith, wherein the temperature for the compression-molding step is maintained by heating means applied to at least one of the press platen; and
   rolling the resultant compression-molded polyolefin, followed by stretching.

19. The process of claim 18, wherein the stretching is performed in multiple steps.

20. The process of claim 18, wherein the stretching in a later step is conducted at a higher temperature than in the preceding step.

21. The process of claim 18, wherein the temperature for the compression-molding step is maintained by a preheater provided in the proximity of at least one of the endless belts.

22. The process of claim 18, wherein the polyolefin is selected from the group consisting of homopolymers of α-olefins having 2-8 carbon atoms, copolymers of ethylene and α-olefins having 3-12 carbon atoms and copolymers of propylene and α-olefins having 2-12 carbon atoms.

23. The process of claim 22, wherein the polyolefin has a particle size distribution in a range of 10-2,000 μm.

24. The process of claim 18, wherein the endless belts have a belt thickness of 0.1-1.5 mm and a surface polished in a mirror-finished state.

25. The process of claim 24, wherein the rollers have an outer diameter of 5-30 mm.

26. The process of claim 18, wherein the endless belts have a running length of 30-400 cm and the press platens apply an average pressure of 0.1-20 kg/cm$^2$ to the endless belts.

27. The process of claim 24, wherein the compression-molding step is performed at 50° C. or higher where the polyolefin is a polyethylene polymer and at 90° C. or higher where the polyolefin is a polypropylene polymer.

28. The process of claim 18, wherein the endless belts are driven at a running speed of 30-400 cm/min.

29. The process of claim 18, wherein the pressing means is fed with a pressure from at least one hydraulic cylinder.

30. The process of claim 18, wherein the compression-molded polyolefin is rolled at a deformation ratio of 1.2-20 in terms of rolling efficiency.

31. The process of claim 30, wherein the rolling step is performed at a rolling temperature in a range of at least 20° C. but lower than the melting point of the polyolefin powder.

32. The process of claim 18, wherein the thus-rolled polyolefin is stretched by pulling the same in accordance with a method selected from the group consisting of hot-air stretching, cylinder stretching, roll stretching and hot-platen stretching.

33. The process of claim 32, wherein the stretching is performed in a temperature range of 20°-150° C.

34. The process of claim 33, wherein the stretching is performed in multiple steps and the stretching in a latter step is conducted at a higher temperature than in the preceding step.

35. The process of claim 18, wherein the stretching is performed in a speed range of 0.1-200 m/min.

36. The process of claim 22, wherein the polyolefin is an ultra-high-molecular-weight polyethylene and the stretching is performed at a draw ratio of at least 60-fold.

* * * * *